(12) United States Patent
Hahn et al.

(10) Patent No.: US 12,135,762 B1
(45) Date of Patent: Nov. 5, 2024

(54) EXTENDED SEMI-SUPERVISED LEARNING GENERATIVE ADVERSARIAL NETWORK

(71) Applicant: THE UNITED STATES OF AMERICA, AS REPRESENTED BY THE SECRETARY OF THE NAVY, Arlington, VA (US)

(72) Inventors: Andrew W. Hahn, Ellicott City, MD (US); Murali Tummala, Monterey, CA (US); James Scrofani, Warrenton, VA (US)

(73) Assignee: THE UNITED STATES OF AMERICA, AS REPRESENTED BY THE SECRETARY OF THE NAVY, Arlington, VA (US)

( * ) Notice: Subject to any disclaimer, the term of this patent is extended or adjusted under 35 U.S.C. 154(b) by 901 days.

(21) Appl. No.: 17/113,731

(22) Filed: Dec. 7, 2020

Related U.S. Application Data

(60) Provisional application No. 63/111,393, filed on Nov. 9, 2020, provisional application No. 62/948,460, filed on Dec. 16, 2019.

(51) Int. Cl.
| | | |
|---|---|---|
| *G06N 20/00* | (2019.01) | |
| *G06F 18/20* | (2023.01) | |
| *G06F 18/2132* | (2023.01) | |
| *G06F 18/214* | (2023.01) | |
| *G06F 18/243* | (2023.01) | |

(52) U.S. Cl.
CPC ...... *G06F 18/2132* (2023.01); *G06F 18/2155* (2023.01); *G06F 18/24317* (2023.01); *G06N 20/00* (2019.01)

(58) Field of Classification Search
CPC .......... G06F 18/2132; G06F 18/24317; G06F 18/2155; G06N 20/00
See application file for complete search history.

(56) References Cited

U.S. PATENT DOCUMENTS

| | | |
|---|---|---|
| 10,474,929 B2 | 11/2019 | Choi et al. |
| 11,475,276 B1 * | 10/2022 | Shrivastava ........... G06N 3/094 |
| 2018/0336471 A1 * | 11/2018 | Rezagholizadeh .... G06N 3/047 |
| 2019/0286950 A1 | 9/2019 | Kiapour et al. |

(Continued)

OTHER PUBLICATIONS

Goodfellow, I., Pouget-Abadie, J., Mirza, M., Xu, B., Warde-Farley, D., Ozair, S., Courville, A., Bengio, Y., "Generative Adversarial Nets," Departement d'informatique et de recherche op'erationnelle, Universite de Montreal, Montr'eal, QC H3C 3J7.

(Continued)

*Primary Examiner* — Mahelet Shiberou
(74) *Attorney, Agent, or Firm* — Heber Martin Carbajal; Scott Bell

(57) ABSTRACT

An extended semi-supervised learning (ESSL) generative adversarial network (GAN) including metrics for evaluating training performance and a method for generating an estimated label vector γ by the extended semi-supervised learning (ESSL) generative adversarial network (GAN) discriminator are described. Embodiments in accordance with the invention improve classification accuracy over convolutional neural networks with improved synthetic imagery.

13 Claims, 7 Drawing Sheets
(4 of 7 Drawing Sheet(s) Filed in Color)

(56) References Cited

U.S. PATENT DOCUMENTS

2020/0379814 A1* 12/2020 Blagodurov ........... G06N 3/047
2022/0240106 A1* 7/2022 Wang ..................... G06N 3/045

OTHER PUBLICATIONS

Mirza, M, Osindero, S., "Conditional Generative Adversarial Nets," arXiv:1411.1784v1 [cs.LG], Nov. 6, 2014.
Radford,A., Metz, L., Chintala, S., "Unsupervised Representation Learning with Deep Convolutional Generative Adversarial Networks," arXiv:1511.06434v2 [cs.LG], Jan. 7, 2016.
Salimans, T., Goodfellow, I., Zaremba, W., Cheung, V., Radford, A., Chen, X., "Improved Techniques for Training GANs," arXiv:1606.03498v1 [cs.LG], Jun. 10, 2016.
Wu, X., Xu, K., and Hall, P., "A survey of image synthesis and editing with generative adversarial networks," Tsinghua Science and Technology, vol. 22, No. 6, pp. 660-674, 2017.
Y. Zhan, D. Hu, Y. Wang, X. Yu, "Semisupervised Hyperspectral Image Classification Based on Generative Adversarial Networks," in IEEE Geoscience and Remote Sensing Letters, vol. 15, No. 2, Feb. 2018.
Zhu, L., Chen, Y., Ghamisi, P., Benediktsson, J., "Generative adversarial networks for hyperspectral image classification," IEEE transactions on geoscience and remote sensing: a publication of the IEEE Geoscience and Remote Sensing Society., vol. 56, No. 9, 2018.
"Hyperspectral Remote Sensing Scenes," Hyperspectral Remote Sensing Scenes—Grupo de Inteligencia Computacional (GIC), May 2011. [Online]. Available: http://www.ehu.eus/ccwintco/index.php/Hyperspectral Remote Sensing Scenes#Salinas—A scene.
LeCun, Y., Cortes, C., and Burges, C., "The MNIST Database," MNIST handwritten digit database, Yann LeCun, Corinna Cortes and Chris Burges. [Online]. Available: http://yann.lecun.com/exdb/mnist/.

* cited by examiner ized to reach a Nash
EXTENDED SEMI-SUPERVISED LEARNING GENERATIVE ADVERSARIAL NETWORK

CROSS-REFERENCE TO RELATED APPLICATIONS

This patent application is a non-provisional of and claims the benefit of U.S. Provisional application 62/948,460, filed Dec. 16, 2019, which is hereby incorporated by reference in its entirety.

BACKGROUND OF THE INVENTION

1. Field of the Invention

The present invention relates generally to a network and method for classification of data and generation of synthetic data in generative adversarial networks.

2. Description of the Related Art

Remote sensing has been able to capture wide swaths of multi-dimensional data from satellite-based sensors. Of the data captured, hyperspectral imagery (HSI) provides a distinct advantage over imagery captured in only the visible spectrum. HSI data has a much wider bandwidth than visible spectrum data, as it incorporates both spatial and spectral information and thus contains much more information about a scene. For this reason, HSI has great utility in a number of applications including environmental sciences, agriculture, and military. The high dimensionality of HSI, however, presents a difficult problem in analysis of the data captured.

Hyperspectral Imagery—Hyperspectral imagery (HSI) data contains both spatial and spectral data, allowing target objects to be analyzed in multiple dimensions. Generally, a pixel in the two dimensional (2-D) spatial space represents a third spectral dimension which contains a spectral response. The spectral responses of each pixel captured contain information regarding the material makeup of the objects being measured and thus can be valuable when analyzed. The nature of HSI is such that a single scene can contain massive amounts of information. A scene with 500×200 samples (pixels) may also contain 200 spectral bands per sample.

A field of data analysis termed deep learning has emerged which attempts to address feature extraction, data representation, pattern recognition, and mapping of complex data from input to output. Many methods within the deep learning field have been used for data analysis, to include multi-layer feedforward networks, recurrent neural networks (RNNs), convolutional neural networks (CNNs), and generative adversarial networks (GANs). GANs have grown popular for use in imagery analysis. The high dimensionality and the nature of the spectral responses in HSI lends itself very well to a deep learning approach to classification.

Generative Adversarial Networks (GANs)—Generative adversarial networks (GANs) have had wide application in data generation and classification. GANs have been shown to be very effective in computer vision problems for highly realistic data generation and improving classification methods over other deep learning methods, especially in unsupervised scenarios.

GANs are generative models having a competitive relationship between two networks, a generator network G and discriminator network D, in order to maximize the performance of the model. The generator network G seeks to generate synthetic data whose distribution converges with the distribution of real data over a period of training. Both real data and synthetic data from the generator network G are input into the discriminator network D, which attempts to classify the input as coming from either the real data or synthetic data distribution. This relationship is described by a mini-max game given by $$\min_G \max_D J(D, G) = E_{x\sim f_x(x)}[\log D(x)] + E_{z\sim f_z(z)}[\log(1 - D(G(z)))] \quad (1)$$

where E is the expectation operator, $f_x(x)$ is the probability density function of the real data, and $f_z(z)$ is the probability density function of noise. Input to output mappings of the discriminator network D and generator network G are represented by $D(\cdot)$ and $G(\cdot)$, respectively.

The end state of the mini-max game is to reach a Nash equilibrium, which can be achieved experimentally. The optimization can be reached through iterative trials and various gradient descent optimization techniques. After a GAN is optimized, the trained discriminator D and generator G networks can be used independently in classification problems and generation capacity, respectively.

FIG. 1 illustrates a general block diagram of a GAN network 100 in the prior art in which a trained discriminator network is transferred to a classifier network 106 for validation. In FIG. 1 a noise batch 108 is input to a generator network 102 which outputs a synthetic data batch 110 $G_{(z)}$. The input to a discriminator network 104 is a real data batch 112 or synthetic data batch 110, and the output from discriminator network 104 is a binary classification 114 representing real data 112 or synthetic data 110. The trained discriminator weights of discriminator network 104 can then be transferred to separate classifier network 106 which is not limited to binary classification. Classifier network 106 can then receive input test data 116 and utilizing the discriminator weights, generate a classification 118 of input test data 116.

A GAN is a general training paradigm and can be implemented with many types of deep learning schemes. CNNs have been successfully implemented as the discriminator network and generator network within a GAN architecture, as shown with the deep convolutional GAN (DCGAN) which has been a benchmark model for research in computer vision applications.

Conditional Generative Models—A conditional GAN integrates an additional independent feature set into the original GAN paradigm. This allows the model to have additional information aside from noise to initiate generation of synthetic data and to encourage greater fidelity in classification. The additional information is manifested by a conditional vector, c, and the synthetic distribution can be given by $f_{gen}(z|c)$.

Semi-supervised Learning—Semi-supervised learning (SSL) extends the traditional GAN learning paradigm from strictly unsupervised learning to a combination of unsupervised and supervised learning by including multi-class classification. This is achieved by changing the output of the discriminator network from binary classification to multi-class classification of size K+1, where K is the number of predefined classes in the real data distribution. However, with the addition of an extra class, K+1, the discriminator network can assign data a "synthetic class," allowing the discriminator to classify data as real or synthetic, and, if the data is classified as coming from the real data distribution, from which class {0, . . . K}.

A GAN can be used effectively as a feature extraction method on HSI and performs very well against comparable deep learning techniques, such as convolutional neural networks (CNN) and recurrent neural networks (RNN), each with various endpoint classifiers. Semi-supervised learning with GAN has also been shown to be effective with HSI. Hyperspectral GAN (HSGAN) is a one dimensional (1-D) network that accepts spectral data with no spatial data; each spectral response is considered an independent sample.

SUMMARY OF THE INVENTION

Embodiments in accordance with the invention provide an extended semi-supervised learning (ESSL) generative adversarial network (GAN) that improves classification of input data. In further embodiments, a method for generating an estimated label vector γ by an extended semi-supervised learning (ESSL) generative adversarial network (GAN) discriminator and a method for generating accurate synthetic data by an extended semi-supervised learning (ESSL) generative adversarial network (GAN) generator are described.

Embodiments in accordance with the invention are best understood by reference to the following detailed description when read in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments in accordance with the invention are further described herein with reference to the drawings.

DETAILED DESCRIPTION OF THE INVENTION

Embodiments in accordance with the invention provide an extended semi-supervised learning (ESSL) GAN and method for generating an estimated label vector γ by an extended semi-supervised learning (ESSL) generative adversarial network (GAN) discriminator that improve classification of spectral signatures in HSI. Embodiments in accordance with the invention, utilize a loss function structured similarly to semi-supervised learning for the discriminator network but updates the loss function for the generator network.

Embodiments in accordance with the invention described herein utilize an HSGAN architecture for the generator and discriminator networks in the experimental trials. Full details of HSGAN are available in "Semisupervised Hyperspectral Image Classification Based on Generative Adversarial Networks," in IEE Geoscience and Remote Sensing letters, Vol. 15, No. 2, Feb. 2018, by Y. Zhan. D. Hu, Y. Wang. and Z. Yu, herein incorporated by reference, and only the function and slightly modified kernel sizes are provided in Table 1.

TABLE 1

| HSGAN/ESSL Architecture | | | |
|---|---|---|---|
| G | | D/C | |
| Operation | Kernel Size | Operation | Kernel Size |
| Input | 1 × 100 | Input | 1 × 204 |
| FullCon | 1 × 1024 | Conv | 64 × 5 |
| FullCon | 1 × 6400 | Conv | 64 × 5 |
| UpSamp | 1 × 2 | MaxPool | |
| Conv | 64 × 5 | Conv | 64 × 5 |
| UpSamp | 1 × 2 | Conv | 64 × 5 |
| Conv | 1 × 5 | MaxPool | |
| FullCon | 1 × 204 | FullCon | 1 × 1024 |
| Output | 1 × 204 | FullCon | 1 × (K + 1) |
| | | Output | 1 × (K + 1) |

The abbreviations listed in Table 1 are defined as follows: FullCon stands for fully connected layer, UpSamp stands for Up Sampling layer, Conv stands for convolutional layer, and maxPool stand for max pooling layer. The output of the discriminator is listed as 1×K+1, where K is the number of real class labels and K+1 is the synthetic classlabel.

Figure 1:
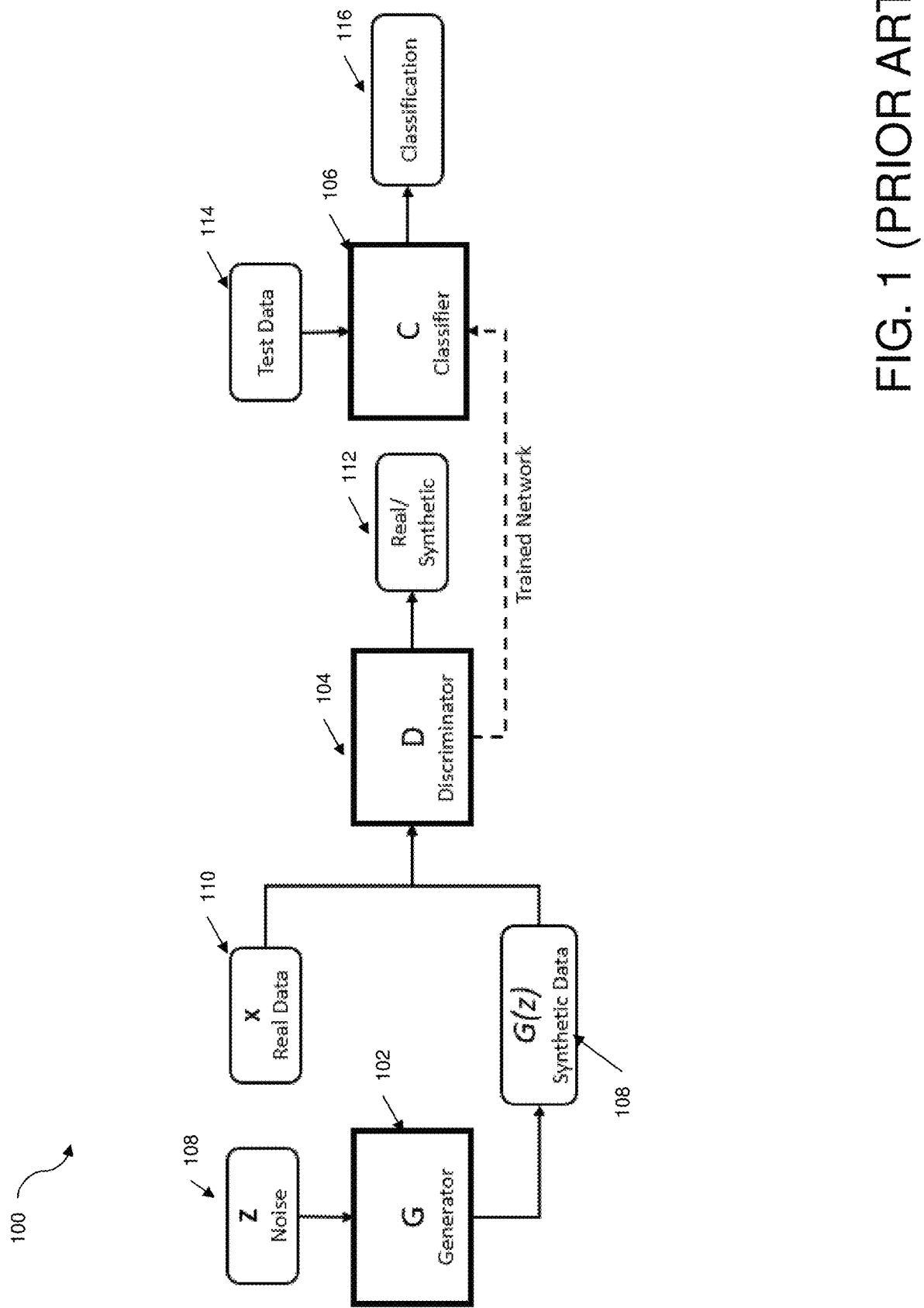
FIG. 1 illustrates a block diagram of a general GAN architecture in the prior art.
Figure 2:
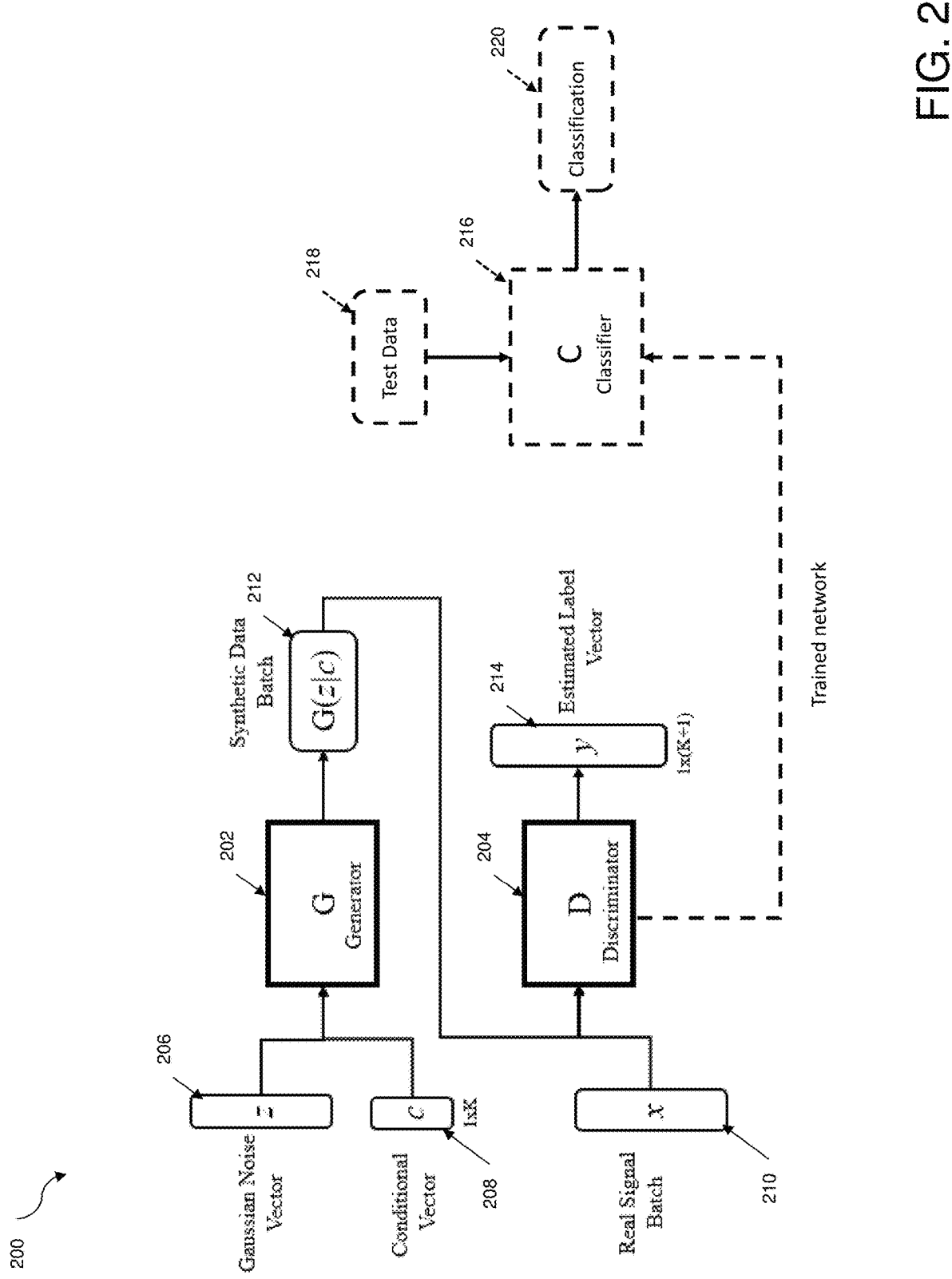
FIG. 2 illustrates one embodiment of an extended semi-supervised learning (ESSL) GAN in accordance with the invention.

FIG. 2 illustrates one embodiment of an ESSL GAN 200 in accordance with the invention. In one embodiment, ESSL GAN 200 includes: a generator network 202, G, which receives inputs of a Gaussian noise vector 206, z, and a conditional vector 208, c, and generates a synthetic data batch 212, G(z|c); and, a discriminator network 204, D, which receives inputs of synthetic data batch 212 and a real signal batch 210, x, and generates an estimated label vector 214, γ, for each input. The trained discriminator weights of discriminator 204 can then be transferred to separate classifier network 216, C. Classifier 106 receives test data 218 and utilizing the discriminator weights, generates a classification 220 of input test data 218.

In ESSL GAN 200, a basic GAN structure is utilized but conditional vector 208 is added to the input of a generator network 202 of size K, where K is the number of classes of the real data. The labels of conditional vector 208 are sampled randomly. Since ESSL GAN 200 now uses conditional vector 208, generator network 202 can be trained based on the cross entropy between the output estimated label vector 214 and conditional vector 208. γ and c, respectively. This allows generator network 202 to not only attempt to mimic the real data distribution, but also to mimic the individual classes.

The loss functions in ESSL GAN 200 share commonalities between the discriminator loss terms with SSL but include a new term developed for the generator loss. The discriminator loss $L_D$ is a linear combination of two loss terms $L_1$ and $L_2$ with an arbitrary scaling factor γ that allows balancing of the two loss terms $L_1$ and $L_2$. The total discriminator loss is given by $$L_D = L_1 + \gamma L_2. \qquad (2)$$

The loss $L_1$ describes the correctness of the discriminator estimated labels given the data is real, given by $$L_1 = -E_{x,y} \sim f_{data}(x,y)[\log f_{model}(\gamma | x, y < K+1)], \qquad (3)$$

where the real data and labels $\{x, y\}$ are sample from the real data distribution $f_{data}(x, y)$.

The second loss $L_2$ describes the discriminator estimation of the real/synthetic given that the data is synthetic, given by $$L_2 = -E_x \sim f_{gen}(z|c)[\log f_{model}(\gamma = K+1 | x)], \qquad (4)$$

where data is sampled from the synthetic distribution $f_{gen}(z|c)$ and is unlabeled.

The loss for the generator network Lu describes the cross entropy term between the intended class of the synthetic data as dictated by conditional vector 208, c, and the output of the model, estimated label vector 214, $\gamma$, given by $$L_G = -E_x \sim f_{gen}(z|c)[\log f_{model}(\gamma = c | x)], \qquad (5)$$

where $f_{gen}(z|c)$ is the synthetic distribution given the conditional vector and $f_{model}(\gamma | x)$ is the model output distribution.

In the general GAN paradigm, the generator network trains to the global distribution of real data and learns global statistics that correspond to the whole real distribution. The ESSL generator loss function $L_D$ provides generator network 202 a priori knowledge of the number of classes available and thus allows generator network 202 to train to class specific statistics. Additionally, discriminator network 204 trains independently of conditional vector 208, c, and only seeks to optimize the classification of synthetic data as synthetic data and real data as its appropriate class. This produces high-quality synthetic data and results in faster training times and greater training stability.

Evaluation Metrics—As ESSL GAN 200 provides a new way of training a GAN, new metrics are developed to evaluate performance over the period of training. To understand model performance, in one embodiment, four metrics are used to evaluate discriminator network 204 and generator network 202 performance over the entire training period.

Discriminator Metrics—To evaluate the performance of discriminator network 204, its effectiveness is tested in both the supervised and unsupervised cases. i.e., correctness of multi-class label classification of real data and correct classification between real and synthetic, respectively. A supervised performance metric for discriminator network 204, herein termed $p_{DS}$, represents the probability that given data sampled from the real distribution is assigned a correct label, and is given by $$p_{DS} = Pr_{model}[\gamma | x, \gamma < K+1], \qquad (6)$$

where x, $\gamma \sim f_{data}(x, y)$.

An unsupervised performance metric for discriminator network 204, herein termed $p_{DU}$, represents the probability that data sampled from the generator is classified correctly as synthetic, or $\gamma = K+1$, and is given by $$p_{DU} = Pr_{model}[\gamma = K+1 | x]. \qquad (7)$$

where $x \sim f_{gen}(z|c)$.

Generator Metrics—The generator performance metrics focus on generator network's 202 ability to produce accurate synthetic data in the classes dictated by the conditional input vector 208, c.

The first metric is the generator precision metric, herein termed $p_{GP}$, represents the probability that discriminator network 204 classifies the synthetic data as both real and the intended class c, given by $$p_{GP} = Pr_{model}[\gamma = c | G(z|c), \gamma < K+1], \qquad (8)$$

where $z \sim f_z(z)$.

Improvement in $p_{DS}$ and $p_{GP}$ jointly suggests that synthetic data distributions are mapping closer to the intended real distributions.

A second metric is a generator error metric, herein termed $p_{GE}$, represents the probability that discriminator network 204 classifies the synthetic data as real, but not the intended class c, given by $$p_{GE} = Pr_{model}[\gamma l = c | G(z|c), \gamma < K+1] \qquad (9)$$

where $z \sim f_z(z)$. Decrease in $p_{GE}$ over the training period represents better performance of generator network 202 in mapping to the intended real class distributions.

Herein while the efficacy of ESSL GAN 200 is illustrated using spectral responses from hyperspectral imagery. ESSL GAN 200 can be applied more generally. For example, in other embodiments, ESSL GAN 200 can be utilized on MNIST as described in "The MNIST DATABASE," MNIST handwritten digit database, by U. LeCun. C. Cortes, and C. Burges, available online at http:///yann.lecun.com/exdb/mnist/.

Those results are presented herein in illustration of model performance, spectral signature classification accuracy, and comparison of synthetic data and real data. The classification results are shown from transferring weights from a discriminator network trained with the method of ESSL GAN 200 to an untrained network of a similar architecture. The generation results show the visual similarity between synthetic imagery and real imagery.

Dataset—Results were generated using the Salinas corrected dataset with two-hundred four (204) spectral bands per pixel and water absorption bands removed as described in "Hyperspectral Remote Sensing Scenes,", Hyperspectral Remote Sensing Scenes—Grupo de Intelligencia Computacional (GIC), May 2011, available online at http://www.e-hu.eus/ccwintoco/index.php/HyperspectralRemoteSensing-Secenes #Salinas-Ascene.

The data was collected from NASA's Airborne Visual/Infrared Imaging Spectrometer (AVIRIS) which collects spectral radiance data from targets in wavelengths ranging from 400 to 2500 nm. Approximately 50.000 samples are available when the image is flattened and individual pixels corresponding to the spectral response of a material are treated as a feature array. The ground truth labels contain sixteen (16) distinct classes that represent the materials imaged in this scene.

Figure 3A:
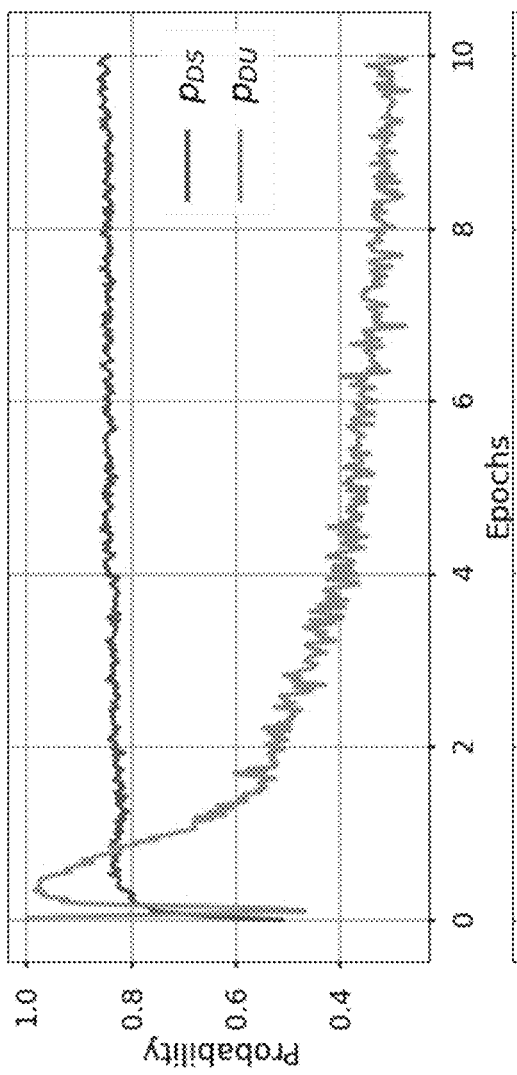
FIG. 3A illustrates the model training evaluation metrics $p_{DS}$ and $p_{DU}$ given in equations 6-9, averaged over 100 training runs.
Figure 3B:
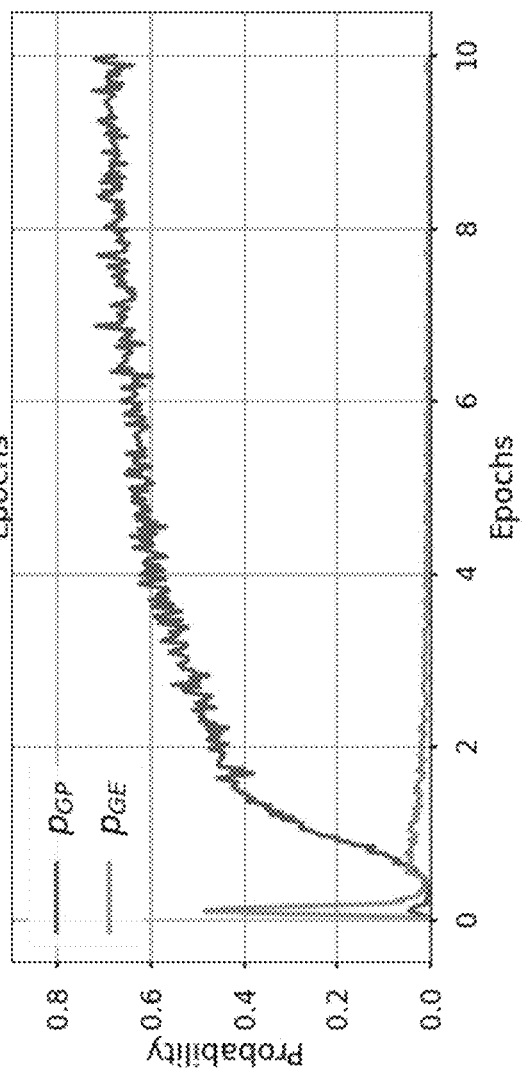
FIG. 3B illustrates the model training evaluation metrics $p_{GP}$ and $p_{GE}$ given in equations 6-9, averaged over 100 training runs.

Model Performance—FIGS. 3A and 3B illustrate model training evaluation metrics, given in equations 6-9, averaged over 100 training runs. The model performance is presented using the earlier described performance metrics—$p_{DU}$, $p_{DS}$, $p_{GP}$ and $p_{GE}$. The top plot in FIG. 3 shows the discriminator performance with the two discriminator metrics plotted versus epochs. Examination of this plot show that $p_{DS}$ rises quickly and converges at ~0.82 for correct classification of real data into its appropriate classes with small variance. The response of $p_{DU}$ shows the discriminator's increasing difficulty over the training run to distinguish synthetic data from real data.

The response of $p_{GP}$ shows the generator's accuracy over the training run increasing, and coupled with the relative stability of $p_{DS}$, implies that the generator is creating increasingly realistic data in each class. The $p_{GE}$ metric shows initial variability early in training but steady state near zero, implying that the generator rarely generates data that is confused for an unintended class.

Figure 4:
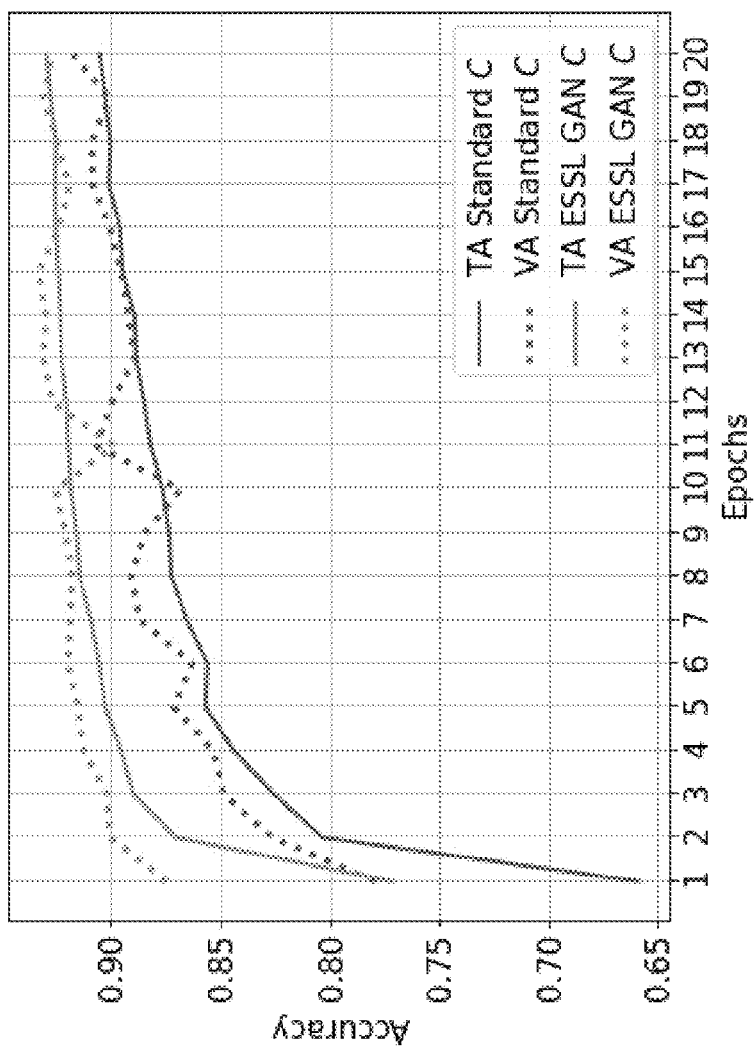
FIG. 4 illustrates training accuracy (TA) and validation accuracy (VA) of a standard CNN classifier versus an embodiment of an ESSL GAN trained classifier in accordance with the invention.

Classification—FIG. 4 illustrates training accuracy (TA) and validation accuracy (VA) of a standard CNN classifier versus an embodiment of an ESSL GAN trained classifier in accordance with the invention. The classification results compare training and validation of traditional CNN as a classifier versus a classifier from a GAN trained with ESSL. The classifiers in both instances are the same architecture as the discriminator network in ESSL GAN 200. Comparison of the two classifiers in this example can be accomplished using training time and validation accuracy. FIG. 4 demonstrates that the CNN transferred from an ESSL GAN reaches over 90% validation accuracy after 2 epochs and maintains that in a steady state over the duration of the training run. By contrast, the traditional CNN does not reach a steady state accuracy until approximately epoch 14, seven times slower than the ESSL GAN CNN. The accuracy achieved on validation data by the ESSL GAN classifier demonstrates an increase of approximately 0.8% over the traditional CNN classifier, shown in Table 2.

TABLE 2

Validation accuracy of classifiers using 10-fold cross validation

| CNN Classifier | ESSL GAN Classifier |
|---|---|
| 0.9125 ± 0.007 | 0.9204 ± 0.0100 |

Figure 5:
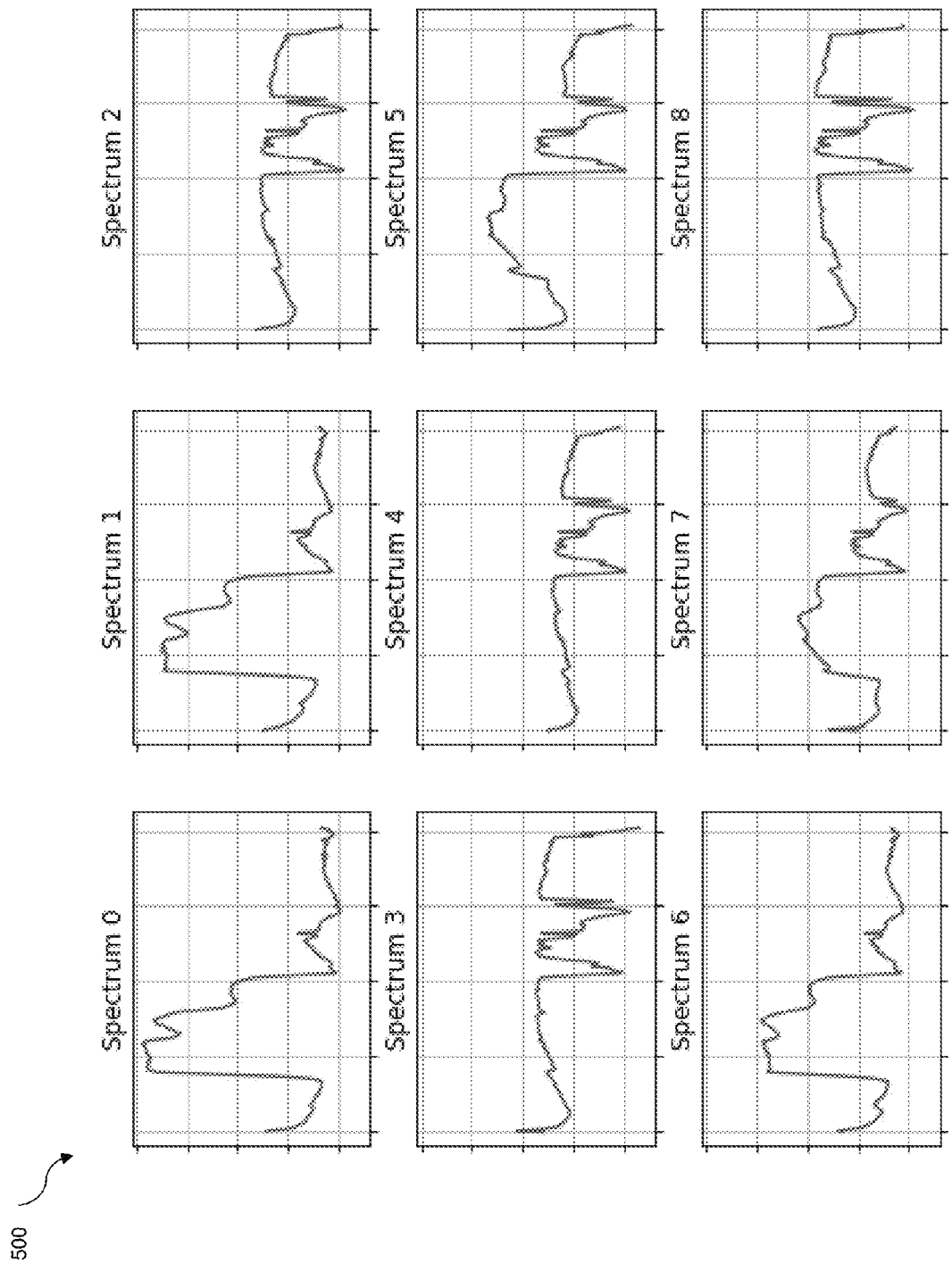
FIG. 5 illustrates synthetic spectral responses generated in accordance with the invention.
Figure 6:
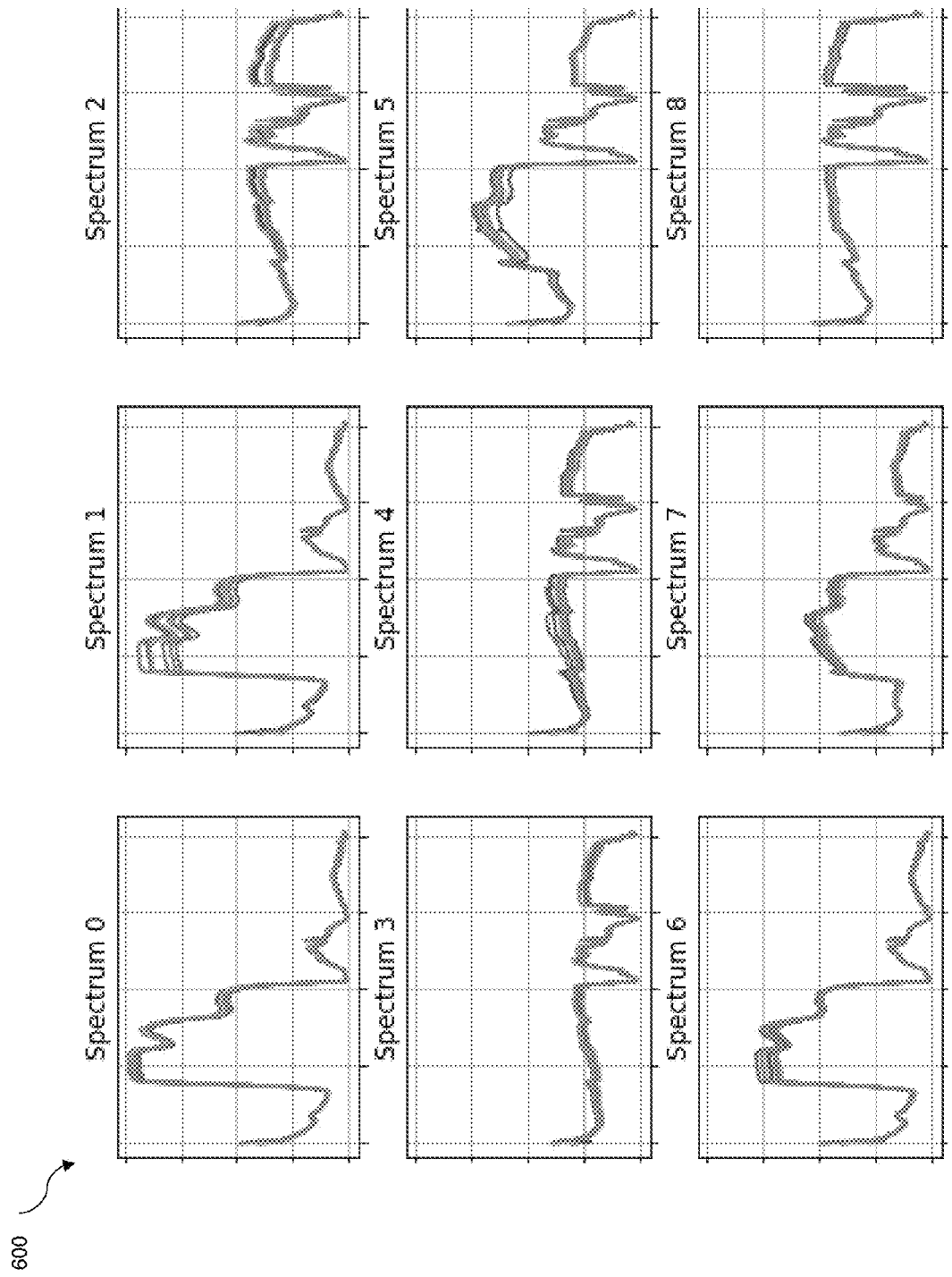
FIG. 6 illustrates multiple overlain examples of the same nine spectra sampled from the real dataset.

Generation—A notable result from the experiments with ESSL GAN network 200 is the generated synthetic data. The resulting synthetic spectral responses are presented for visual comparison in FIGS. 5 and 6. FIG. 5 illustrates synthetic spectral responses generated in accordance with the invention. The spectra displayed in FIG. 5 are from the first nine classes in the data set, generated by setting the corresponding label in the conditional input vector to the generator. FIG. 6 illustrates multiple overlain examples of the same nine spectra sampled from the real dataset. The first nine spectra from each, labeled as Spectrum 0-8. Slight variability can be seen in the real spectral responses shown in FIG. 6, however, the signals appear very closely correlated. The synthetic spectra are virtually indistinguishable from the real spectra, showing that once training has converged, the generator is capable of generating accurate synthetic data. Moreover, by altering the conditional vector c, the output can be controlled to each individual class.

These experimental results illustrate that embodiments in accordance with ESSL GAN 200 described herein generate accurate synthetic HSI data when converged, which can lead to augmenting imbalanced data sets. The embodiments of the ESSL GAN 200 described herein advance classification of 1-D HSI spectra, showing applicability for use in many HSI or other domain classification and segmentation problems.

Figure 7:
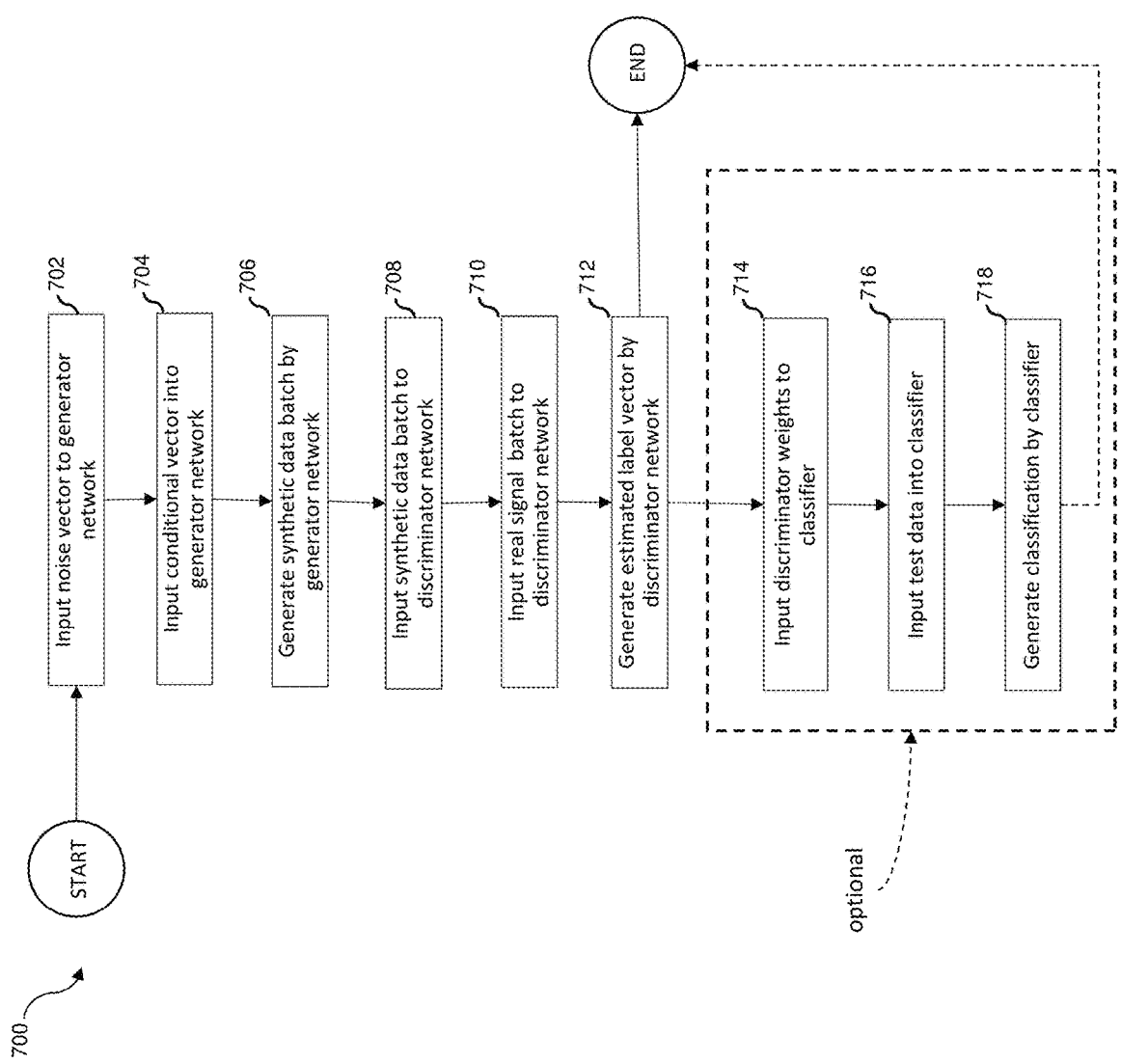
FIG. 7 illustrates one embodiment of a process flow diagram for a method for generating an estimated label vector γ using the extended semi-supervised learning (ESSL) GAN network of FIG. 2 in accordance with the invention.

FIG. 7 illustrates one embodiment of a method for generating estimated label vector γ 214 using an extended semi-supervised learning (ESSL) GAN 200 in accordance with the invention. Referring now to FIG. 7 together with FIGS. 1-6, in operation 702, Gaussian noise vector 206, z, is input to generator network 202. In operation 704 conditional vector 208, c, is input to generator network 202. In operation 706, generator network 202 generates synthetic data batch 212, G(z|c), based on the inputs. In operation 708, synthetic data batch 212, G(z|c), is input to discriminator network 204. In operation 710, discriminator network 204 generates estimated label vector 214, γ, based on the input. Optionally, in operation 714, the discriminator weights of discriminator network 204 are input to a classifier network 216, C. In operation 716, classifier network 216 receives an input of test data 218, and utilizing the discriminator weights, in operation 718, generates an output classification 220 of the input test data.

As detailed herein embodiments in accordance with the invention provide a viable training scheme given a priori knowledge of the number of classes in a data set and that accurate labeled data exists. Embodiments in accordance with the invention provide an alternative to other deep learning methods and shows improvement against a traditional CNN classifier in both speed of retraining and validation accuracy.

This description provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention.

What is claimed is:

1. An extended semi-supervised learning (ESSL) generative adversarial network (GAN) comprising:
    a generator network G, the generator network G comprising:
        an input for receiving a noise vector z;
        an input for receiving a conditional vector c, wherein the conditional vector c is the size K, and K is a number of classes, wherein the number of classes is based on priori knowledge of the number of classes of a generator loss function $L_D$; and
        an output for outputting a synthetic data batch G(z|c) generated by the generator network G, wherein the synthetic data batch G(z|c) is based on a distribution of a real signal batch x and one or more classes of the real signal batch x; and
    a discriminator network D communicatively coupled to the generator network G, the discriminator network D comprising:
        an input for receiving the synthetic data batch G(z|c);
        an input for receiving the real signal batch x;
        discriminator weights;
        an optimizer for optimizing the synthetic data batch and the real data batch as its appropriate class; and
        an output for outputting an estimated label vector γ generated by the discriminator network D for each synthetic data batch G(z|c) input and each real signal batch x input based on the discriminator weights.

2. The ESSL GAN of claim 1, further comprising:
    a classifier network C communicatively coupled to the discriminator network D, the classifier network C comprising:
        an input for receiving test data; and
        an output for outputting a classification of the test data, wherein the classifier network C generates the classification of the test data based on the discriminator weights of discriminator network D, and outputs the classification of the test data.

3. The ESSL GAN of claim 2, wherein the generator network is trained based on the cross entropy between the output estimated label vector γ and the conditional vector c.

4. The ESSL GAN of claim 2, wherein the estimated label vector γ is given by γ=D(x) where x is the input, either real or synthetic data, and D(·) is a mapping function that represents the Discriminator, The generator is optimized by the cross entropy loss function between the conditional vector c and estimated label vector γ, given by $L_G = -E_x \sim f_{gen}(z|c)[\log f_{model}(\gamma=c|x)]$, where $f_{gen}(z|c)$ is the synthetic distribution given the conditional vector and $f_{model}(\gamma|x)$ is the model output distribution.

5. The ESSL GAN of claim 2, wherein the discriminator network D further comprises method for generating discriminator weights.

6. An extended semi-supervised learning (ESSL) generative adversarial network (GAN), the ESSL GAN comprising a non-transitory computer readable medium storing instruction for execution by a processor, wherein the instructions are for:
generating an estimated label vector γ;
receiving an input of a noise vector z at a generator network G;
receiving an input of a conditional vector c at the generator network G, wherein the conditional vector c is the size K, and K is a number of classes, wherein the number of classes is based on a number of classes of a generator loss function $L_D$;
generating a synthetic data batch G(z|c) by the generator network G, wherein the synthetic data batch is based on a distribution of a real signal batch x and one or more classes of the real signal batch x;
inputting one of the synthetic data batch G(z|c) or the real signal batch x to an input of a discriminator network D communicatively coupled to the generator network G;
optimizing a classification of the synthetic data batch G(z|c) based only on the synthetic data batch and the real data batch as its appropriate class; and
generating an estimated label vector γ by the discriminator network D for each synthetic data batch G(z|c) input and each real signal batch x input based on discriminator weights.

7. The ESSL GAN of claim 6, wherein the generator network is trained based on the cross entropy between the output estimated label vector γ and the conditional vector c.

8. The ESSL GAN of claim 6, wherein the estimated label vector γ is given by γ=D(x) where x is the input, either real or synthetic data, and D(·) is a mapping function that represents the Discriminator, The generator is optimized by the cross entropy loss function between the conditional vector c and estimated label vector γ, given by $L_G = -E_x \sim f_{gen}(z|c)[\log f_{model}(\gamma=c|x)]$, where $f_{gen}(z|c)$ is the synthetic distribution given the conditional vector and $f_{model}(\gamma|x)$ is the model output distribution.

9. An extended semi-supervised learning (ESSL) generative adversarial network (GAN) discriminator, the ESSL GAN discriminator comprising a non-transitory computer readable medium storing instructions for execution by a processor, wherein the instructions are for:
generating an estimated label vector γ;
receiving an input of one of a synthetic data batch G(z|c) and a real signal batch x, by a discriminator, wherein the synthetic data batch is based on a conditional vector, wherein the conditional vector is the size K, and K is a number of classes, wherein the number of classes is based on a number of classes of a generator loss function $L_D$;
optimizing a classification of the synthetic data batch G(z|c) based only on the synthetic data batch G(z|c) and the real data batch as its appropriate class; and
generating an estimated label vector γ for each synthetic data batch G(z|c) input and each real signal batch x input based on discriminator weights.

10. The ESSL GAN of claim 9, wherein the estimated label vector γ is given by γ=D(x) where x is the input, either real or synthetic data, and D(·) is a mapping function that represents the discriminator, wherein the generator is optimized by the cross entropy loss function between the conditional vector c and estimated label vector γ, given by $L_G = -E_x \sim f_{gen}(z|c)[\log f_{model}(\gamma=c|x)]$, where $f_{gen}(z|c)$ is the synthetic distribution given the conditional vector and $f_{model}(\gamma|x)$ is the model output distribution.

11. The ESSL GAN of claim 10, wherein the conditional vector is the size K, and K is a number of classes, wherein the number of classes is based on priori knowledge of the number of classes of a generator loss function $L_D$.

12. The ESSL GAN of claim 11, wherein the generator loss function is a linear combination of two loss term L1 and L2;
wherein $L_D = L1 + \gamma L2$, and γ is a term balancer.

13. The ESSL GAN of claim 9, wherein only the appropriate class of the synthetic data batch as synthetic data batch and real data batch is optimized.

* * * * *